United States Patent [19]

Marchywka et al.

[11] Patent Number: 5,359,411
[45] Date of Patent: Oct. 25, 1994

[54] METHOD AND APPARATUS FOR EVALUATING THE OPTICAL SPATIAL RESPONSE CHARACTERISTICS OF OBJECTS

[75] Inventors: Michael J. Marchywka, Lanham; Dennis G. Socker, Bowie, both of Md.

[73] Assignee: The United States of America as represented by the Secretary of the Navy, Washington, D.C.

[21] Appl. No.: 896,079

[22] Filed: Jun. 8, 1992

[51] Int. Cl.⁵ ................................................ G01B 9/02
[52] U.S. Cl. .................................... 356/345; 356/359
[58] Field of Search ............... 356/345, 353, 354, 359, 356/360

[56] References Cited

U.S. PATENT DOCUMENTS

| | | | |
|---|---|---|---|
| 4,496,216 | 1/1985 | Cowan | 359/566 |
| 5,231,468 | 7/1993 | Deason et al. | 356/359 |

Primary Examiner—Samuel A. Turner
Assistant Examiner—Robert Kim
Attorney, Agent, or Firm—Thomas E. McDonnell; Edward F. Miles

[57] ABSTRACT

An apparatus and method for optically testing an object, such as an optical detector whose pixels are an array of optically sensitive charged coupled devices. Two mutually coherent beams of light are interfered on the object to form an interference fringe pattern of sinusoidally varying intensity of preselected spatial frequency. The object's response at this spatial frequency is used to determine one point of the object's modulation transfer function at that frequency. This is preferably done by using the device's output to infer the coherence function of the fringe pattern, taking the Fourier transform of the coherence function, and determining the amplitude of the function at the spatial frequency of the fringe pattern. The process can be repeated for different spatial frequencies until one determines the entire modulation transfer function.

8 Claims, 1 Drawing Sheet

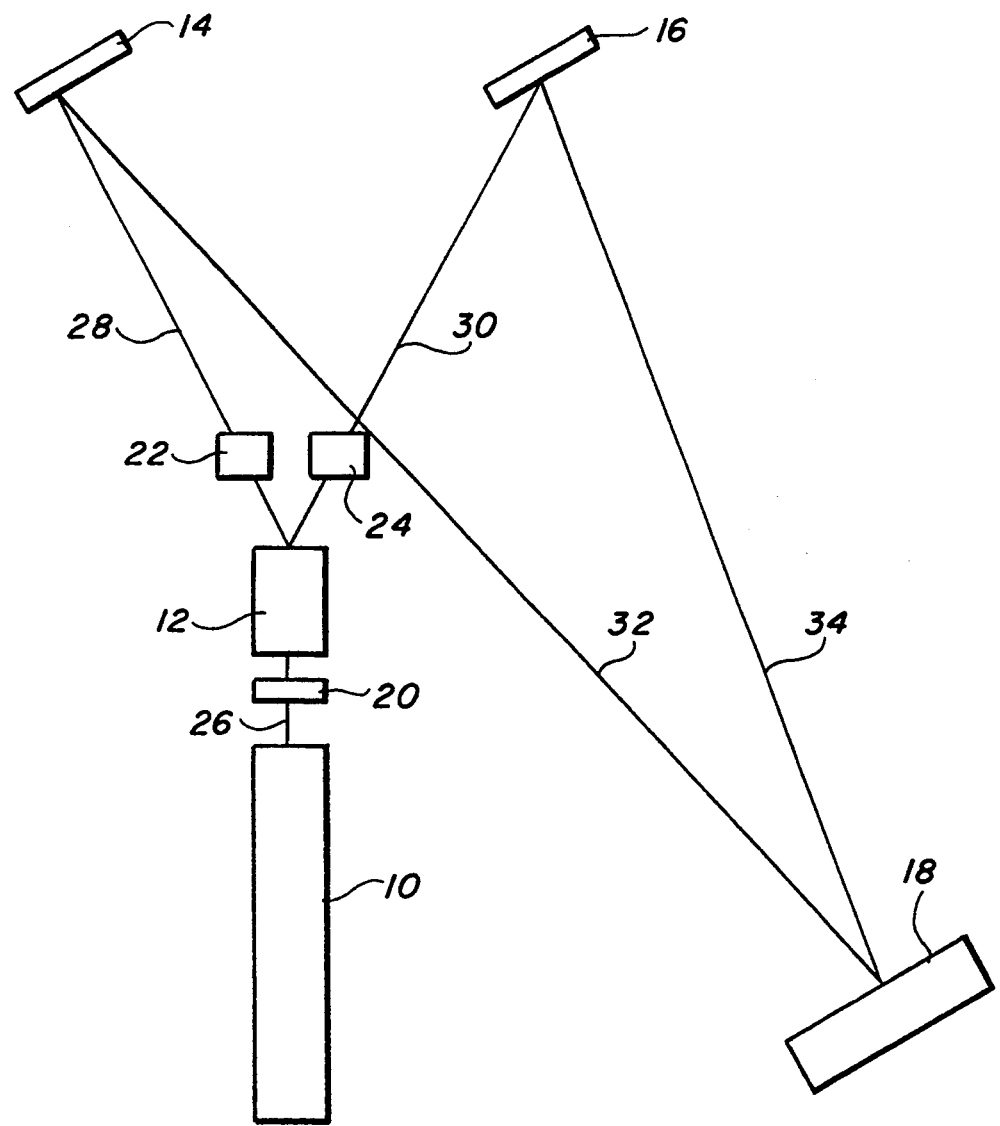

METHOD AND APPARATUS FOR EVALUATING THE OPTICAL SPATIAL RESPONSE CHARACTERISTICS OF OBJECTS

BACKGROUND OF THE INVENTION

Optical detectors are important to a variety of laboratory and industrial techniques. One example of such a detector is an array of optically sensitive elements forming its pixels, such as an array of optically responsive charge coupled devices. In typical applications, the output of the array is the sum of the responses (the total charge accumulated by all the pixels) in response to a given illumination. Unfortunately, no two charge coupled devices (or any other device which can be used as an optical detector) is perfectly linear, nor can any two such devices be manufactured identical to one another. These imperfections affect the overall response of the array, more markedly so as the features of the image on the detector becomes small with respect to the area of the array exposed to illumination. Thus to be useful, such a device must be calibrated accurately as a function of spatial frequency.

Prior techniques for performing this calibration have not been wholly satisfactory, particularly at higher spatial frequencies. One approach has been to use a sharp, opaque, surface combined with lenses and other optics to spatially localize illumination on a selected part of the array. One measures the array's response, and then proceeds to another portion of the array. Finally, all the individual responses are integrated to infer the device's overall response to the input light. This response, expressed as a function of spatial frequency, is often referred to as a Modulation Transfer Function, or MTF, of the device, and is the ratio of the output signal which device 18 produces to the optical signal input, as a function of spatial frequency. Unfortunately, this approach necessarily limits the size of the image to one much smaller than the array itself, which, among other effects, scatters energy into higher spatial frequencies, which introduces inaccuracies when attempting to account for all the energy transduced by the array so as to calculate the MTF. Similarly, the edge itself and the lenses perturb the optical wavefront of the input illumination, which also has energy at higher spatial frequencies. It is difficult to correct for all these effects of the optics used to focus the illumination, especially at higher spatial frequencies. Moreover, the lenses focus the incident image onto a focal plane which typically has a narrow depth of focus, limited area of extent, and has a curvature that rarely matches that of the object's surface. This makes the placement of the object with respect to the lenses both critical and difficult.

Another approach is to use lenses to image a bar pattern, or pattern of sinusoidally varying translucence, onto the array, and measure its response. The response provides one point of the MTF, i.e. that of the spatial frequency corresponding to that of the bar or sinusoidally varying pattern. One generates the entire MTF by repeating this measurement for all spatial frequencies of interest. Unfortunately, the fidelity of this measurement is again compromised by the lenses' effects and the finite extent of the image produced, by the lenses limited depth of focus, as well as by the limits with which one can accurately produce bar or sinusoidally varying patterns in the first place, particularly at higher spatial frequencies.

SUMMARY OF THE INVENTION

Accordingly, an object of the invention is to characterize the optical response of objects more accurately, in particular to measure the Modulation transfer function of such objects more accurately.

Another object is to perform such a characterization without lenses, or sharp optical boundaries, which would have optical energy at other spatial frequencies.

Another object is to perform such a characterization with optical images which have a large depth of focus, large area of extent, and whose quality is uniform over a large volume.

Another object is to perform such a characterization without the need for projecting prefabricated patterns, such as bar patterns or sinusoidally varying negatives.

Another object is to perform such a characterization with an apparatus which permits one to switch quickly, easily, and controllably from one spatial frequency to another.

In accordance with these and other objects made apparent hereinafter, the invention concerns an apparatus and method for optically testing an object, such as an array of photosensitive elements. In accordance with the invention, one provides a first and second beam of light which are non-mutually incoherent with respect to one another (i.e. will form an interference fringe pattern with one another), interferes the beams to form a sinusoidally varying interference fringe pattern on the object, of a preselected spatial frequency, and determines the optical response of the object to the fringe pattern. One then knows the response of the object to the spatial frequency of the interference fringe. One can then repeat this sequence for other spatial frequencies, generating if one wishes the entire Modulation Transfer Function of the object.

Because the invention uses an interference pattern as the optical input to the object, it need not use prefabricated patterns or the lenses needed to focus them onto the object, and hence avoids the inaccuracies created by this sort of optics. Unlike images created by lensing, the interference pattern has a large depth of focus and lateral extent, yielding a large volume in which one can place the object with assurance that it will be irradiated by a highly a uniform pattern. This ensures that variations between object input and output will be due to the object, and not the optics of the testing system.

In a preferred embodiment, one detects the response of the object to both beams separately illuminating the object, and the response with both beams illuminating it together. These responses are used to calculate the coherence function of the beams with respect to one another, which will be a function of spatial frequency. By taking the Fourier transform of the coherence function, one gets the amplitude of the object's response at the spatial frequency defined by the interference fringe produced by the two beams. This constitutes one point of the Modulation Transfer Function. Repeating this sequence at other spatial frequencies permits one to generate the entire transfer function.

In another preferred embodiment, rotatable mirrors are used to project the two beams onto the object. By rotating the beams with respect to one another, one can quickly and controllably change the spatial frequency of the interference pattern.

Many aspects of the invention are addressed in a set of in viewgraphs by the inventors from the I.E.E.E. CCD Workshop Waterloo, Ontario, June, 1991, and the paper by the inventors, An MTF Measurement Technique for Small Pixel Detectors, which has been submitted for publication in Applied Optics, Optical Technology. A copy of the viewgraphs and paper are filed along with this application, and the viewgraphs and paper are incorporated herein by reference.

The invention is further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

The drawing figure is a schematic illustrating the operation of a preferred apparatus for practicing the invention.

DETAILED DESCRIPTION

The drawing figure shows an apparatus set up to investigate the optical response of an object 18. Laser 10 produces a light beam 26 which spatial filter 12 divides into two non-mutually incoherent beams 28, 30. Spatial filter 12 can be a lens which focuses light from laser 10 onto a pinhole, creating a divergent cone of light exiting the pinhole. Beams 28, 30 are the portions of that cone subtended by mirrors 14, 16. Mirrors 14, 16 reflect beams 28, 30 onto object 18 as reflected beams 32, 34, where the beams interfere. The intensity of the interference fringe pattern varies sinusoidally across the face of object 18 in accordance with known principles of coherent optics. Shutters 22 and 24 can selectively isolate object 18 from, or illuminate object 18 with, light beams 28, 32 and 30, 34. Shutter 20 isolates all light from the apparatus, when desired. Shutters 22, 24 must have relatively sizeable apertures to fully illuminate object 18. It is frequently difficult to make two shutters open simultaneously, especially two as large as 22, 24. Having shutter 20 closed until after both 22 and 24 open ensures that neither beam 32 or 34 illuminate object 18 alone when one is attempting to form an interference fringe on object 18. Because of its placement adjacent laser 10, shutter 20 can be relatively small, and hence more readily cycled.

In operation, object 18 is illuminated sequentially with shutter 22 open and shutter 24 closed (to determine the response of object 18 to beam 28, 32), with shutter 22 closed and 24 open (to determine the response of object 18 to beam 30, 34) and with both shutters 22, 24 open. If object 18 is an optical array whose pixels are constituted by optically sensitive charge coupled devices, the response measured would be determined preferably by integrating the charge produced in all the pixels responsive to the illumination. One also measures the response of object 18 with shutter 20 closed (no illumination). This establishes the dark response of device 18 (e.g., the D.C. offset of a semiconductor device, such as a charge coupled device), which is used to correct measurements made with illumination in order to obtain true readings.

Using these measurements, one can then calculate the coherence function of beams 32 and 34 with respect to one another. If the response of object 18 to beam 32 is $A_1$, the response to beam 34 is $A_2$, and the response to both beams together is I, one can write the coherence function F as:

$$F=(I-A_1-A_2)/(A_1 A_2)^{\frac{1}{2}}.$$

Which, of course, is a function of spatial frequency. One can then take the Fourier transform of F, and note the amplitude of it at the spatial frequency of the interference fringe. This gives one point on the Modulation Transfer Function. If one rotates mirrors 14, 16 with respect to one another, one changes the spacing of the interference fringe incident on object 18 (i.e. changes the incident spatial frequency), and one can repeat the foregoing steps to generate as many points on the Modulation Transfer Function of object 18 as one wishes.

The invention has been described in what is considered to be the most practical and preferred embodiments. It is recognized, however, that obvious modifications may occur to those with skill in this art. Accordingly, the scope of the invention is to be discerned solely by reference to the appended claims, wherein:

We claim:

1. An apparatus for optically testing an object, said apparatus comprising:
   means for providing a first and second beam of light, said first and second beams being non-mutually incoherent with respect to one another;
   means for interfering said first and said second beams to form a sinusoidally varying interference fringe pattern on said object, said fringe pattern having a first preselected spatial frequency;
   means for determining the optical response of said object to said fringe pattern of said first preselected spatial frequency;
   means for causing said means for providing and said means for interfering to form at least one additional sinusoidally varying interference fringe pattern on said object of a preselected spatial frequency different from said first preselected spatial frequency; and
   means for causing said means for determining to determine the optical response of said object to said at least one additional sinusoidally varying interference fringe pattern.

2. The apparatus of claim 1, wherein:
   said means for providing a first and a second beam comprises a laser, and a means for forming light from said laser into said first and said second beams;
   said means for interfering comprises a first mirror disposed to direct said first beam onto said object, and a second mirror disposed to direct said second beam onto said object.

3. A method for optically testing an object, said method comprising:
   providing a first and second beam of light, said first and second beams being non-mutually incoherent with respect to one another;
   interfering said first and said second beams to form a sinusoidally varying interference fringe pattern on said object, said fringe pattern having a preselected spatial frequency;
   determining the optical response of said object to said fringe pattern;
   repeating said steps for interfering and determining for at least one additional preselected spatial frequency different from the above said preselected spatial frequency.

4. A method for optically testing an object, said method comprising:
- providing a first and second beam of light, said first and second beams being non-mutually incoherent with respect to one another;
- interfering said first and said second beams to form a sinusoidally varying interference fringe pattern on said object, said fringe pattern having a preselected spatial frequency;
- determining the optical response of said object to said fringe pattern;
- repeating said steps for interfering and determining for at least one additional preselected spatial frequency different from the above said preselected spatial frequency;
- wherein said step for determining the optical response of said object comprises steps for:
- illuminating said object with said first beam;
- determining the response $A_1$ of said illuminating with said first beam;
- illuminating said object with said second beam;
- determining the response $A_2$ of said illuminating with said second beam;
- determining the response I of said object to said step for interfering;
- determining F such that $F=(I-A_1-A_2)/(A_1A_2)^{\frac{1}{2}}$;
- determining the Fourier transform of said F;
- determining the magnitude of said Fourier transform at said preselected spatial frequency.

5. A method for determining the modulation transfer function of an object, said method comprising:
- providing a first and second beam of light, said first and second beams being non-mutually incoherent with respect to one another;
- interfering said first and said second beams to form a sinusoidally varying interference fringe pattern on said object, said fringe pattern having a preselected spatial frequency;
- determining the optical response of said object to said fringe pattern;
- repeating said steps for interfering and determining a sufficient number of times for a sufficient number of spatial frequencies to determine said modulation transfer function.

6. A method for determining the modulation transfer function of an object, said method comprising:
- providing a first and second beam of light, said first and second beams being non-mutually incoherent with respect to one another;
- interfering said first and said second beams to form a sinusoidally varying interference fringe pattern on said object, said fringe pattern having a preselected spatial frequency;
- determining the optical response of said object to said fringe pattern;
- repeating said steps for interfering and determining a sufficient number of times for a sufficient number of spatial frequencies to determine said modulation transfer function;
- wherein said step for determining the optical response of said object comprises steps for:
- illuminating said object with said first beam;
- determining the response $A_1$ of said illuminating with said first beam;
- illuminating said object with said second beam;
- determining the response $A_2$ of said illuminating with said second beam;
- determining the response I of said object to said step for interfering;
- determining F such that $F=(I-A_1-A_2)/(A_1A_2)^{\frac{1}{2}}$;
- determining the Fourier transform of said F;
- determining the magnitude of said Fourier transform at said preselected spatial frequency.

7. The apparatus of claim 2, wherein said first and said second mirrors are rotatable with respect to one another effective to permit selection of said preselected spatial frequency different from said first preselected spatial frequency.

8. An apparatus for optically testing an object, said object being effective to output a signal responsive to optical illumination, said apparatus comprising:
- means for providing a first and second beam of light, said first and second beams being non-mutually incoherent with respect to one another;
- means for illuminating said object by interfering said first and said second beams to form a sinusoidally varying interference fringe pattern on said object, said fringe pattern having a first preselected spatial frequency;
- means for determining the output signal of said object responsive to said fringe pattern; and
- said means for illuminating said object by interfering said first and said second beams being adapted to selectably form an additional sinusoidally varying interference fringe pattern on said object, said additional sinusoidally varying interference fringe pattern having a preselected spatial frequency different from said first preselected spatial frequency; and
- said means for determining is adapted to output signal of said object responsive to said fringe pattern of said second preselected spatial frequency.

* * * * *